US009027753B2

(12) United States Patent
Bak et al.

(10) Patent No.: US 9,027,753 B2
(45) Date of Patent: May 12, 2015

(54) PACKAGING SYSTEM FOR PORTABLE ELECTRONIC DEVICES WITH REMOVABLE FACEPLATES

(75) Inventors: James Bak, Plainview, NY (US); Craig Hassler, Scarsdale, NY (US)

(73) Assignee: CBY Holdings, LLC, Boston, MA (US)

( * ) Notice: Subject to any disclaimer, the term of this patent is extended or adjusted under 35 U.S.C. 154(b) by 1922 days.

(21) Appl. No.: 11/951,423

(22) Filed: Dec. 6, 2007

(65) Prior Publication Data

US 2008/0137269 A1     Jun. 12, 2008

Related U.S. Application Data

(60) Provisional application No. 60/868,853, filed on Dec. 6, 2006.

(51) Int. Cl.
    *B65D 73/00*        (2006.01)
    *B65D 5/50*         (2006.01)
    *H04M 1/02*        (2006.01)
    *B65D 75/36*        (2006.01)

(52) U.S. Cl.
    CPC .............. *H04M 1/0283* (2013.01); *B65D 75/36* (2013.01); *B65D 75/366* (2013.01)

(58) Field of Classification Search
    CPC .... B65D 75/36; B65D 75/366; B65D 81/025; B65D 25/24
    USPC ......... 206/779, 780, 775, 461, 462, 471, 470, 206/320
    See application file for complete search history.

(56) References Cited

U.S. PATENT DOCUMENTS

| | | | | |
|---|---|---|---|---|
| 3,402,810 A | * | 9/1968 | Percelay | 206/461 |
| 3,838,229 A | | 9/1974 | Morrell et al. | |
| 4,292,481 A | | 9/1981 | Barnes et al. | |
| 4,637,516 A | * | 1/1987 | de Roure | 206/471 |
| 5,768,370 A | | 6/1998 | Maatta et al. | |
| D446,526 S | | 8/2001 | Evers | |
| 6,401,932 B1 | * | 6/2002 | Weinstein et al. | 206/779 |
| 6,437,976 B1 | | 8/2002 | Wolff et al. | |
| 6,856,043 B2 | | 2/2005 | DeLeeuw | |
| 7,490,724 B2 | * | 2/2009 | Weck et al. | 206/471 |

* cited by examiner

*Primary Examiner* — Mickey Yu
*Assistant Examiner* — Chun Cheung
(74) *Attorney, Agent, or Firm* — Neal Gerber & Eisenberg LLP

(57) ABSTRACT

A removable faceplate for a portable electronic device is provided. The faceplate permits a user to change the physical appearance of a surface of the device while retaining access to the mechanisms for controlling the function of the device. Preferably, the removable faceplate and electronic device are configured with a means for association and dissociation that can be activated without the use of a tool and the means is not visible when the faceplate is attached. Additionally, an improved packaging system is provided to enable a vendor or manufacturer to package faceplates with the devices that they will cover and to allow substitution of faceplates in the packaging without disturbing the packaging of the electronic device itself. Further, there is a method for distribution of the packaging system.

9 Claims, 5 Drawing Sheets

PACKAGING SYSTEM FOR PORTABLE ELECTRONIC DEVICES WITH REMOVABLE FACEPLATES

CROSS-REFERENCE TO RELATED APPLICATION

This application claims the benefit of U.S. Provisional Application Ser. No. 60/868,853, filed Dec. 6, 2006. The entire disclosure of that application is incorporated by reference as if set forth fully herein.

BACKGROUND OF THE INVENTION

Portable electronic devices such as DVD players, radios, cassette recorders, CD players, personal media players such as Coby Electronics PMP 4320 portable media player, and digital music replay (MP3) devices such as Apple's iPod MP3 player enable users to receive transmissions or to play content essentially wherever and whenever they want. As the recording and video industries have moved from analog to digital technologies, the volume of content that many of these devices can store has increased dramatically. At the same time, the weight and size of these devices has decreased significantly. Accordingly, users are taking these devices to more places and using them for longer amounts of time.

In addition to maximizing storage capabilities while minimizing size, many users desire to personalize the look of their electronic devices. From the manufacturer's standpoint, customization presents a challenge. The manufacturer could offer a limited number of options, e.g., a few different colors, without significantly increasing the cost of manufacturing its goods. Unfortunately, consumers often demand more choices than a handful of different colors. Another challenge is how to provide a large variety of customized choices for the consumer without requiring the retailer to stock large amounts of inventory.

One alternative is for manufacturers to offer consumers the option of ordering customized electronic devices, such as devices with specific designs, insignias, logos, etc. However, this would unduly hamper the ability of the manufacturer to provide a timely product on a cost-effective basis. Moreover, the same consumer may want to be able to change the look of his or her device without needing to purchase a plurality of devices.

Thus, there is a need to provide consumers with a mechanism by which to personalize their electronic devices while being able to permit manufacturers to satisfy this need on a cost effective basis.

SUMMARY OF THE INVENTION

The present invention relates to the use of removable faceplates for electronic devices, the electronic devices with which the faceplates may become associated and improved systems for packaging and distributing these items.

According to one embodiment, the present invention provides an electronic device comprising:
a. a base housing; and
b. a removable faceplate, wherein the removable faceplate comprises
   i. at least one aperture; and
   ii. an association element that permits the removable faceplate to retain contact with the base housing, wherein the association element is not visible when the removable faceplate and the base housing are engaged.

According to another embodiment, the present invention provides a unique packaging approach and method for product distribution that allows a retailer or end-user to select the faceplate to be employed with the electronic device without destroying the integrity of the packaging that houses the electronic device itself. The method comprises:
a. providing a base housing in a packaging system at a first location, wherein said packaging system comprises
   i. a first compartment, wherein said first compartment comprises a first closure element, located within said first compartment is the base housing, and said first closure element is engaged;
   ii. a second compartment, wherein said second compartment is configured to receive a faceplate and is oriented on top of said first compartment, and said second compartment comprises a second closure element, wherein said second closure element is not engaged;
c. moving said packaging system to a second location;
d. enclosing said faceplate in said second compartment at said second location; and
e. engaging said second closure element.

According to another embodiment, the present invention provides a packaging system comprising:
a. a first compartment, wherein said first compartment comprises an irreversible first closure element and said first compartment has an inside shape that is substantially similar to the outside shape of an electronic device; and
b. a second compartment, wherein said second compartment has an inside shape that is substantially similar to the outside shape of a faceplate and is oriented on a side of said first compartment.

One of the benefits of certain embodiments of the packaging system is that it enables customization of the electronic device prior to sale without increasing the potential for loss or theft of the electronic device. Another benefit of certain embodiments of the packaging system according to the present invention is that it provides a method for distributing in the marketplace, an electronic device featuring removable faceplates that allows the retailer to stock separately desired quantities of the electronic device and removable faceplate options, thereby providing both the retailer and the end user with flexibility in keeping desired quantities of inventory of the electronic device and associated removable faceplates. An additional benefit of certain embodiments of the packaging system is that it allows for micro-targeted delivery of custom faceplates to specific markets thereby decreasing the costs of shipping, storage of inventory and/or returns of products.

DETAILED DESCRIPTION OF THE INVENTION

Figure 1:
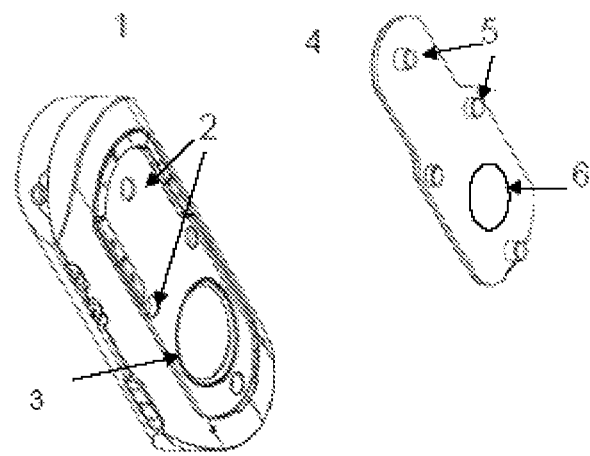
FIG. 1 is a representation of an embodiment of the present invention comprising a base housing and a removable faceplate.

Any of the features of the various embodiments described herein can be used in conjunction with features described in connection with any other embodiments disclosed unless otherwise specified. Accordingly, features described in connection with the various or specific embodiments are not to be construed as not suitable in connection with other embodiments disclosed herein unless such exclusivity is explicitly stated or implicit from the context.

According to one embodiment, the present invention is directed to an electronic device that comprises: (a) a base housing; and (b) a removable faceplate. The base housing comprises the electronic circuitry of the electronic device that enables the user to access audio, video or audiovisual content that has been stored or recorded by digital or analog means or that is being received contemporaneously from an outside source such as a radio station. Examples of electronic devices include but are not limited to DVD players, radios, cassette recorders, CD players, personal media players such as Coby Electronics PMP 4320 and digital music replay (MP3) devices such as Apple's iPod MP3 player.

The base housing may comprise input mechanisms to control the relaying or playing of the content, e.g., buttons that can be depressed to initiate one or more of the following functions: volume, tuning, scan, seek, play, stop, pause, skip forward, and skip backward. Alternatively, one or more of these functions can be controlled through a touch screen or dial. The base housing may further comprise an output mechanism to enable the listener to hear music through, for example, a speaker or set of headphones.

The base housing may be of any three-dimensional shape that is either irregular or regular. When the shape is regular or substantially regular, the base housing may have front, rear, left, right, top and bottom sides. If the shape is truly irregular, then any side that can be assumed to be the side that is typically displayed to the user may be deemed the front. In some embodiments, the front side provides access to the control mechanisms and visual access to any display screen that may be present. Alternatively, either the input mechanisms and/or any display screen may be located on a side other than the front. In embodiments in which the base housing is a regular shape, or substantially regular, preferably the front side and the rear side are the sides with the most surface area.

The base housing may in theory be of any size and weight. However, when the device is to be carried by a user, preferably the device is small enough to be carried in one's hand, worn from a cord around one's neck, affixed to one's clothing, encased in a small pouch affixed to a one's arm or waist or stored in a small handbag or sport bag.

The removable faceplate is designed to permit a user to change the appearance of the device by himself or herself. Thus, a person could purchase one base housing and a plurality of removable faceplates and, by way of example, change the faceplate to match an outfit or to show affiliation with a different sports team during a different season. Different removable faceplates may, for example, comprise different colors, patterns, designs, or logos for sports teams or other affiliations such as schools, employers or vocations.

The removable faceplate is a component that is designed to sit on at least one side of the base housing, e.g., the front side. The removable faceplate may, for example, come in contact with only one side of the base housing. In some embodiments, the removable faceplate comprises at least one aperture. An aperture may, for example, be an opening that permits visual access to the base housing. The term "aperture" as used herein refers to an opening within the removable faceplate that has a perimeter that is entirely circumscribed by the removable faceplate. For example, an aperture may comprise a circle through which a liquid crystal display may be viewed. An aperture may also be configured to permit access to input buttons, e.g., buttons that can be depressed to initiate one or more of the following functions: volume, tuning, scan, seek, play, stop, pause, skip forward, and skip backward. These buttons may protrude in whole or in part through the aperture. Additionally, for any aperture that is designed to allow viewing but not needed for physical access, the aperture may be covered with a transparent or translucent material such as glass or plastic.

The faceplate may have a smaller area than the side of the base housing with which it will become associated. This may allow access to input mechanisms that are not circumscribed by the removable faceplate.

The removable faceplate and the base housing preferably comprise an association element that permits the removable faceplate to retain contact with the base housing and to be disassociated from the base housing without the use of tools. The methods for association may, e.g., include physical and/or magnetic means. Preferably the association means is not visible when the removable faceplate and base housing are in contact. The base housing may have one or more complementary or additional elements that facilitate the function of the association element. This additional element of the base housing may or may not be visible when the removable faceplate is associated with it. For aesthetic reasons, it may be desirable to have this additional element not be visible when the removable faceplate and the base housing are associated.

According to some embodiments, the association element may comprise a magnet if the circuitry within the base housing is adequately protected so as to prevent interference from any magnetic field or the strength of the magnetic field is sufficiently small that it has either no or a negligible effect on the function of the electronic device. Thus, the removable faceplate may be magnetized in whole or in part and the base housing may comprise a metal. The strength of the magnet should be sufficient to permit the removable faceplate to retain strong association with the base housing during normal user conditions, e.g., walking, jogging, running, jumping, or being carried in a handbag, suitcase, sport bag or briefcase. The base housing may comprise a depression of the same or substantially similar shape to the removable faceplate. The depth of the depression is preferably of a size that provides a physical barrier against sliding while still permitting a user to pull the faceplate off with his or her fingers.

An alternative exemplary association means comprises a plurality of elastic pieces projecting from an underside of the removable faceplate. For example, the plurality may comprise at least four elastic pieces, preferably between four and eight pieces. The elastic pieces may be cylindrical and may, for example, comprise rubber or any other material that may be compressed to a size smaller than its resting state while exhibiting outward force when held in the compressed state.

When this association means is employed, preferably the base housing comprises an equal number or greater number of openings for receipt of said plurality of elastic pieces. Each opening preferably has a first diameter and the elastic pieces each have a second diameter that is greater than the first diameter when the base housing and removable metal plate are not engaged. The elastic pieces may all have the same diameter, or may have different diameters. The use of different diameters may facilitate orienting the faceplate, particularly if the faceplate is of a uniform shape.

This embodiment may be further appreciated by reference to FIG. 1. The removable faceplate 4 has on its underside a plurality of elastic pieces 5. The removable faceplate also has an aperture 6 that provides an opening from the underside through to the topside. On the topside (not shown) may appear any design, authorized logo, color etc. The base housing 1 has a plurality of depressions 2 that correspond to the elastic pieces of the removable faceplate. The base housing also comprises a display 3 that can be seen through the aperture of the removable faceplate when assembled.

The removable faceplate may also make use of releasable latching mechanisms that are activated by placing direct pressure on the removable faceplate and an indirect sliding motion of the faceplate, or through the use of an actuating release mechanism attached to the base housing. If the latter means is used, preferably the release mechanism is viewable from the rear or side of the base housing.

According to a second embodiment, the present invention is directed to a novel packaging system for portable electronic devices that effectively presents the end user or a retailer with a way to select a faceplate desired for use with the electronic device without destroying the integrity of the packaging that encloses the electronic device itself. The method comprises providing a base housing and a faceplate in a two part packaging system and sealing the first part containing the electronic device of the packaging system at one location and the second part, which can hold a faceplate, at a second location. The faceplate of this embodiment includes, but is not limited to, the removable faceplate of the previous embodiment.

The packaging system preferably comprises at least two compartments, a first compartment and a second compartment. The first compartment is designed to have an inner space that is shaped substantially the same as the outer shape of the base housing. The term shape refers to the configuration of surface of the base housing that will contact the first compartment. The first compartment also comprises a first closure element that comprises edges that may be affixed to each other to form a seal, e.g., through a heat seal or a glue seal. At a first location, a manufacturer or distributor may insert the base housing into the first compartment and seal that compartment. Preferably, the first closure element is not reversible. Thus, once sealed, if the first compartment is subsequently opened, the first closure element cannot be used again.

The second compartment is preferably designed to have an inner space that is shaped substantially the same as the outer shape of at least one faceplate. The second compartment comprises a second closure element. At the first location, at least one removable faceplate may be inserted into the second compartment; however preferably, the second closure element is not activated at that site. (Unless otherwise specified, the terms "activated" and "engaged" are used interchangeably.) Alternatively the second compartment could remain empty at that site. In a further embodiment, the inner space of the second compartment is of a sufficient depth to receive at least two or more faceplates. The two or more faceplates may for example, represent different teams with a sports league or different teams for different sports located in a particular geographic region.

Preferably the second compartment is oriented on top of the first compartment and in a configuration that simulates how the faceplate would appear on the base housing when assembled. By orienting the second compartment on top of the first compartment, the system allows a potential customer to view the appearance of the base housing with the faceplate prior to purchasing it.

Figure 2:
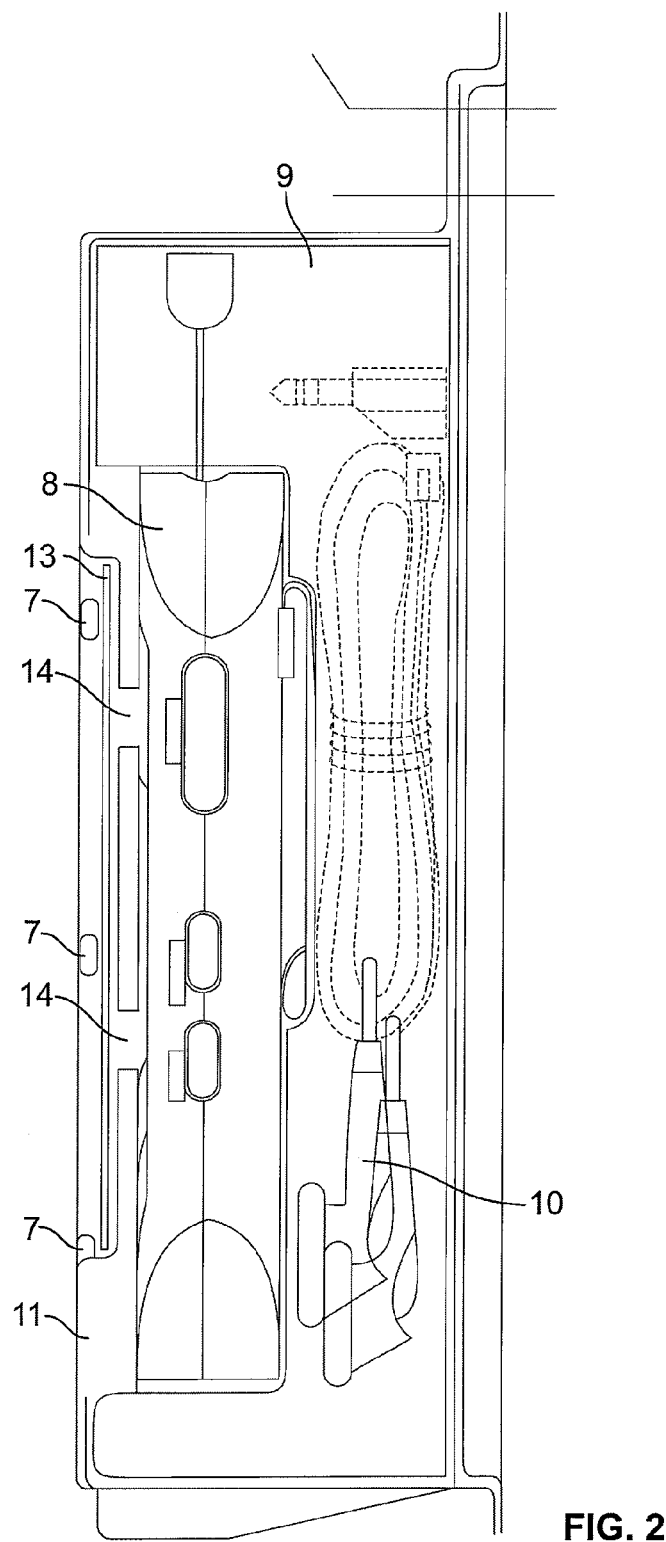
FIG. 2 is a representation of a packaging system of the present invention comprising a first compartment and a second compartment.

FIG. 2 illustrates a cross-section of an embodiment of the present invention that houses both an electronic device and a faceplate. The electronic device 8 is within a nested cavity of a first compartment 9 that has a shape that is substantially the same and the electronic device. Beneath the electronic device is an accessory item, a set of headphones 10. The faceplate 13 is located within a cavity of the second compartment. In the embodiment shown, the same plastic piece may form the top of the first compartment and the bottom of the second compartment. The faceplate may or may not be entirely encased. In the figure, the faceplate is not entirely encased, but instead held in place by plastic elements 7 protruding from the side of the second compartment and above the faceplate.

Figure 3:
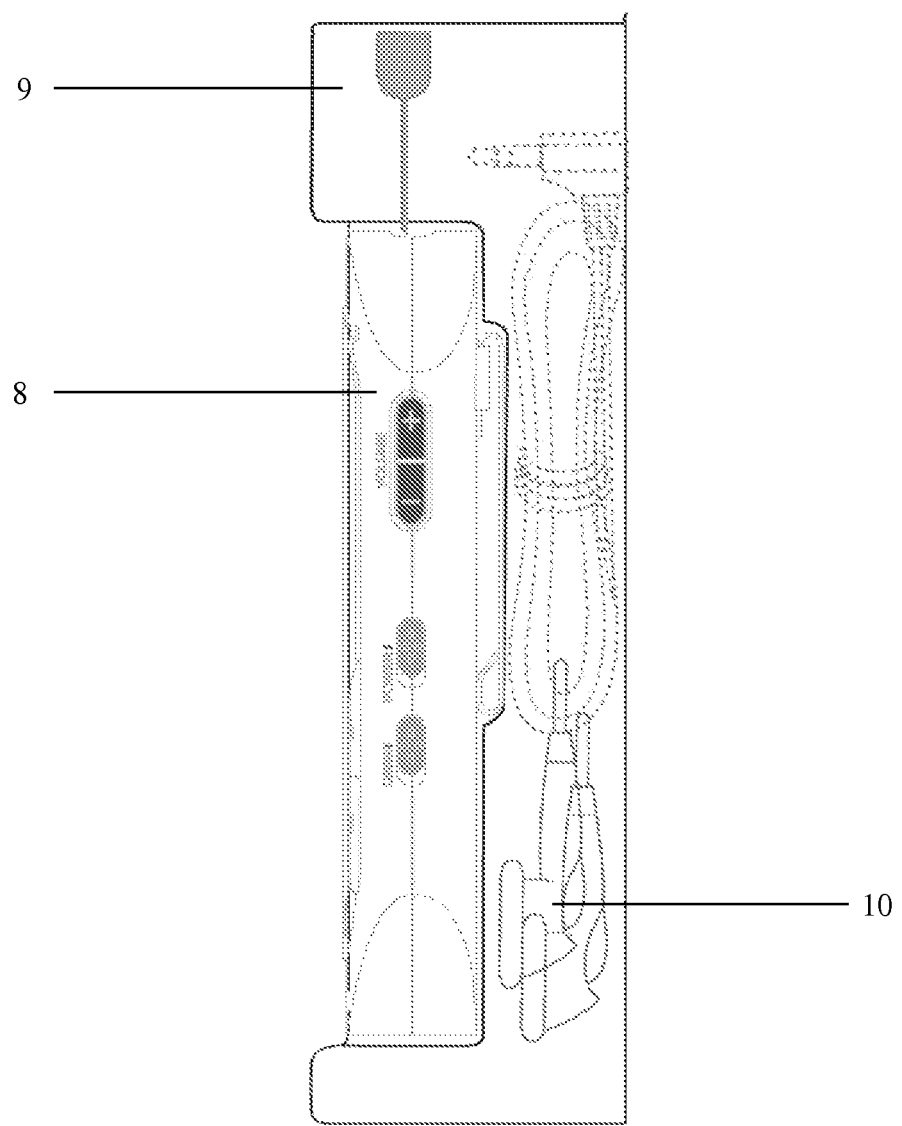
FIG. 3 is a representation of a first compartment of the present invention without the second compartment.

FIG. 3 shows a similar cross-section without the second compartment or faceplate. Thus, the electronic device 8 is within the cavity of the first compartment 9. The accessory element 10 is also present.

Figure 4:
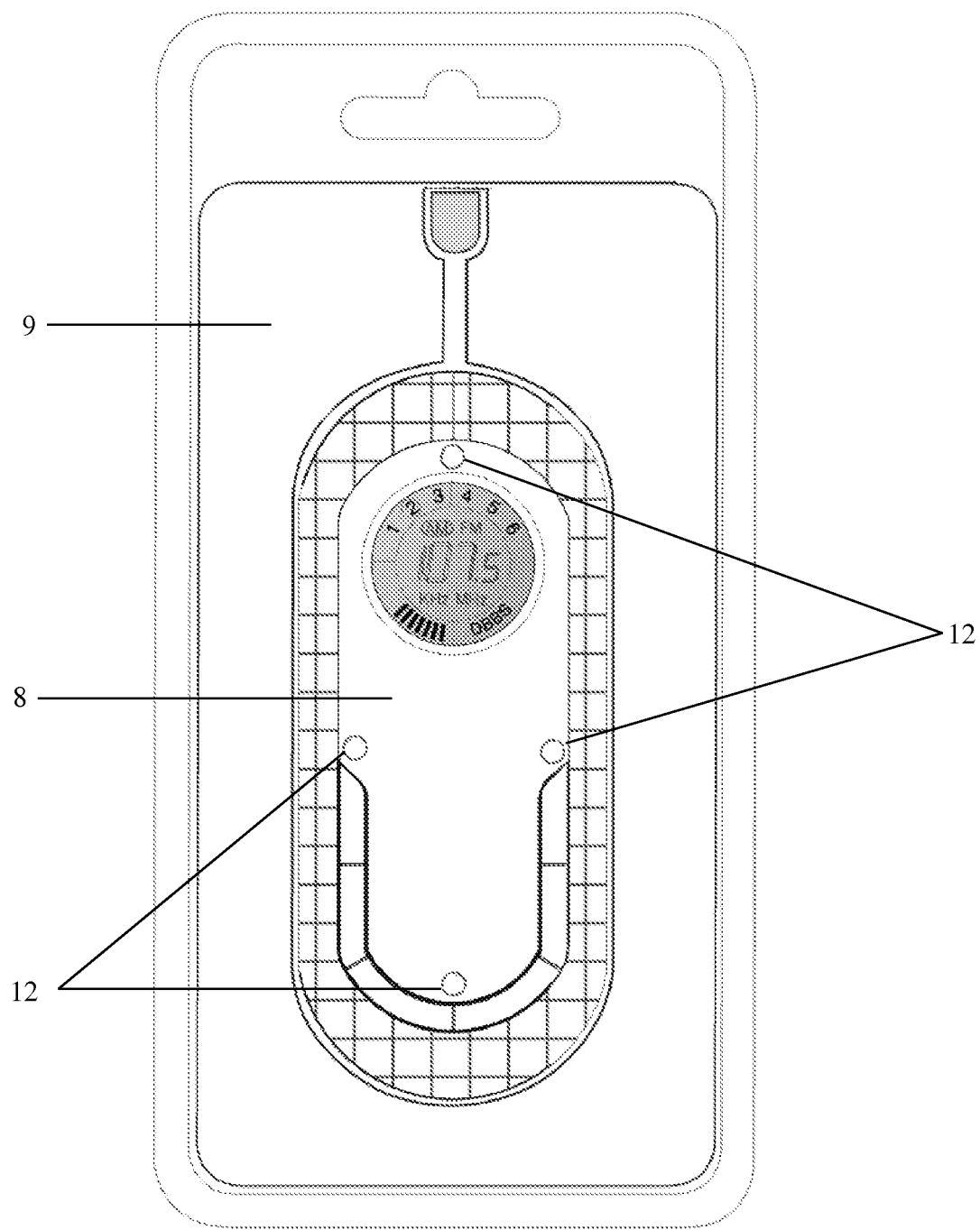
FIG. 4 is another representation of a first compartment of the present invention without the second compartment.

FIG. 4 shows a front view of an electronic device 8 within a portion of a first compartment 9 of a packaging system. The electronic device contains four circular indentations 12 that will allow for the receipt of the elastic pieces of the faceplate. The top portion of the first compartment is not shown in this figure but would entirely encase the electronic device and optionally may have similar depressions. The faceplate, also not shown, could rest in position by having its elastic pieces sit in those depressions while within the packaging system.

Figure 5:
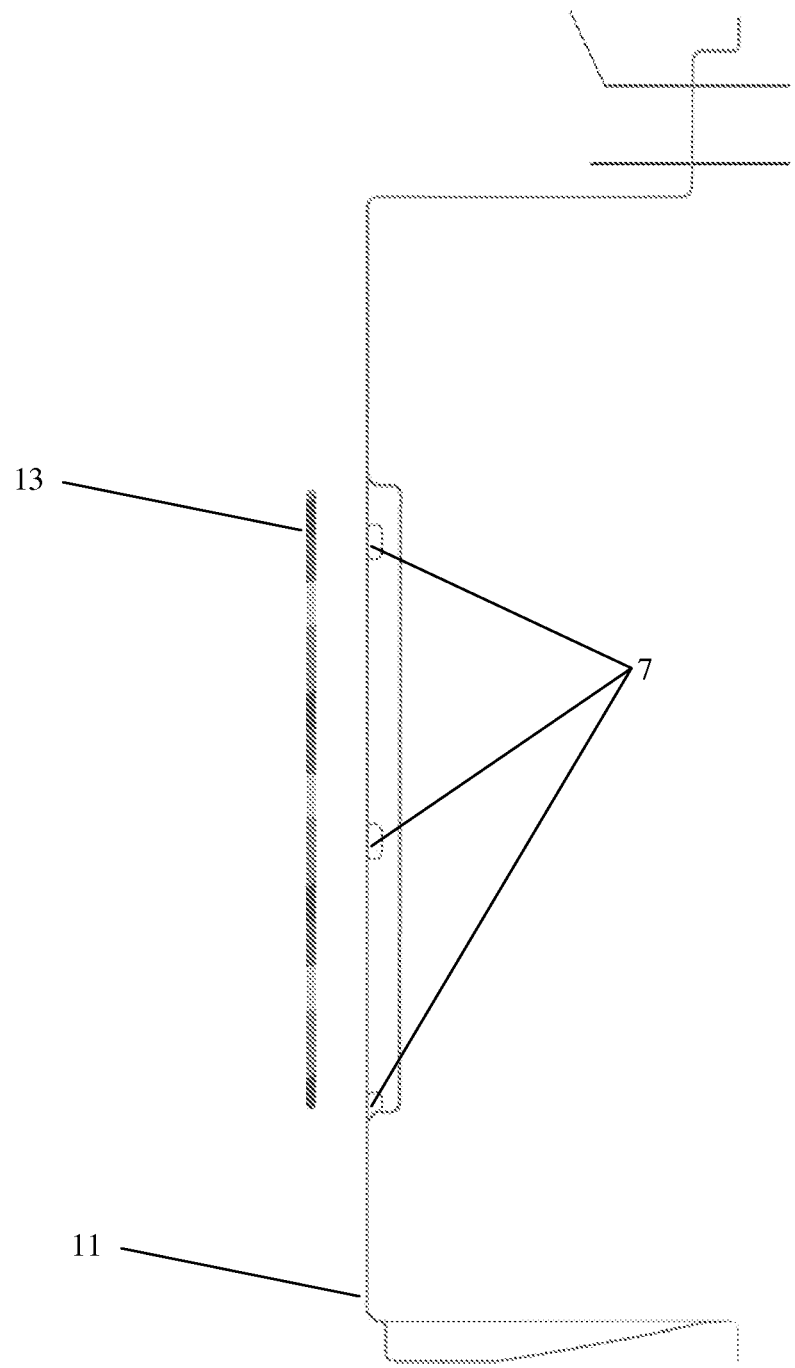
FIG. 5 is a representation of a second compartment of the present invention.

FIG. 5 shows a cross-section of the second compartment 11 of a packaging system that may be used in combination with the first compartment shown in FIG. 3. In FIG. 5 the faceplate 13 is shown removed from the system. The protruding plastic elements 7 that can hold the faceplate in place regardless of whether the faceplate is completely or only partially enclosed are also shown.

The packaging system may then be sent to a second location, for example a location in a different part of a city, or a different city, state or country. The second location may, for example, be that of a retailer, customer or distributor. At the second location a desired faceplate may be inserted into the second compartment. At that time, the second closure element may be activated by, for example, heat or glue sealing. Alternatively, the desired faceplate could be inserted into the second compartment at the first location, but the second closure element not activated or engaged until it arrives at the second location.

The second compartment may also comprise a third closure element that is reversible. Thus, at the first location the faceplate can be inserted into the second compartment, and the third closure element may be reversibly engaged. The third closure element may, for example, comprise a snap or other physical means for closing the second compartment. At the second location, the customer may disengage the third closure element and substitute the faceplate that was originally inserted by the manufacturer with a different faceplate and at that time or later activate or engage the second closure element or reactivate the third closure element. Alternatively, the customer may leave the faceplate that was received from the manufacturer and activate the second closure element with that faceplate enclosed. Depending on the configuration of the second and third closure elements in relationship to each other, it may be necessary to disengage the third closure element prior to engaging the second closure element By deferring the time of sealing the second compartment, a retailer, customer or distributor need not decide which removable faceplate to include in a sales package at the time of ordering from a supplier or manufacturer. Instead, the retailer, customer or distributor may order a stock of base housings, each sealed in a first compartment and a separate stock of faceplates that can be inserted when different sets are sold.

According to a third embodiment the present invention is directed to a packaging system. The packaging system of this embodiment includes a first compartment that has an inside surface that has a shape that is substantially the same as the outside shape of an electronic device. The packaging system also comprises a second compartment that has an inside surface that has a shape that is the substantially the same shape as the outside configuration of a faceplate. The first compartment may contain a first closure element that preferably does not allow for reversible closure. The second compartment preferably comprises a second closure element that also does not allow for reversible closure. The second compartment may also comprise a third closure element that does allow for reversible closure.

The first compartment and the second compartment of this embodiment may be oriented to simulate how a removable faceplate may appear when engaged with an electronic device. There may be a complete barrier e.g., plastic, between the first compartment and the second compartment or the two compartments may contain gaps to allow for physical contact between the faceplate and the electronic device. For example, where the association device is a plurality of elastic pieces, the second compartment may comprise plastic that completely covers the portions of the elastic pieces that would otherwise contact the electronic devices. Alternatively, the second compartment may contain holes that allow the elastic pieces to protrude through them. In this embodiment, the first compartment would preferably contain the same holes.

According to a fourth embodiment the present invention is directed to a packaging system that permits a faceplate to contact or simulate contact with an electronic device when in the packaging system, as well as allowing the faceplate to be removed and replaced with another faceplate without destroying the integrity of the packaging system. Thus, there may be a first compartment that comprises an inner surface that has a shape that is substantially the same as the shape of the outer surface of an electronic device. There may also be a second compartment that has an inner surface with a shape that is substantially the same as the shape of the outer surface of a faceplate. The first compartment and the second compartment may each comprise openings that allow the faceplate and the electronic device to become engaged. For example, there may be openings that allow magnetic elements on the faceplate to come into contact with electronic device. In another embodiment, the second compartment may contain holes that allow elastic pieces to protrude through them. In this embodiment, the first compartment would preferably contain the same holes.

The packaging system may also provide an access element such as a flap, opening or other means that permits direct access to the faceplate and second compartment. The faceplate may then be removed and substituted with another faceplate. The second compartment may also comprise a second closure element that when engaged prevents the subsequent substitution of faceplates. The access element may used either with or without a third closure element as described above.

The benefits of certain embodiments of this system include allowing retailers to sell a larger variety of products without significantly increasing costs. For example, the retailer, customer or distributor need not guess which sports team will be in favor with the local public prior to the season. Instead the retailer, customer or distributor may order a number of electronic devices and faceplates for a number of different teams. In a display case, he or she may change the shown team affiliation as frequently as desired. The retailer can also carryover base housings from, for example, baseball season to football season by changing the faceplates within the second compartment. Thus, a retailer may have in his or her possession a larger number of faceplates than electronic devices with which they can become associated.

What is claimed:

1. A packaging system for an electronic device that allows a faceplate to contact or simulate contact with the electronic device in the packaging system, and further allows the faceplate to be removed and replaced with another faceplate without destroying the integrity of the packaging system comprising:
   a. an electronic device having a base housing;
   b. a removable faceplate designed to engage with the base housing of the electronic device; and
   c. a package comprising a first compartment having an inside surface that has a shape that is substantially similar to a shape of an outside surface of the base housing; and a second compartment having an inside surface that has a shape that is substantially similar to a shape of an outside surface of the removable faceplate and that is oriented on a side of said first compartment to simulate how the removable faceplate would appear when engaged with an electronic device.

2. The packaging system of claim 1 wherein said second compartment further comprises elements to hold the removable faceplate in place in the second compartment.

3. The packaging system of claim 1 further comprising an access element, wherein said access element provides access to said second compartment.

4. The packaging system of claim 1 wherein said first compartment and said second compartment each comprise openings that allow the faceplate and the electronic device to become engaged.

5. The packaging system of claim 1 wherein the faceplate comprises an association element that permits the removable faceplate to retain contact with the base housing of the electronic device and to be disassociated from the base housing.

6. The packaging system of claim 5 wherein the association element comprises magnetic elements.

7. The packaging system of claim 6 wherein the first compartment and said second compartment each comprise openings that allow the magnetic elements to come in contact with the electronic device.

8. The packaging system of claim 5 wherein the association element comprises a plurality of elastic pieces projecting from the removable faceplate.

9. The packaging system of claim 8 wherein the first compartment and said second compartment each comprise openings in the form of holes that allow the elastic pieces to protrude through.

* * * * *